United States Patent [19]

Longhouse

[11] 4,181,172
[45] Jan. 1, 1980

[54] FAN SHROUD ARRANGEMENT

[75] Inventor: Richard E. Longhouse, Rochester, Mich.

[73] Assignee: General Motors Corporation, Detroit, Mich.

[21] Appl. No.: 812,130

[22] Filed: Jul. 1, 1977

[51] Int. Cl.² .................................................. F28F 13/06
[52] U.S. Cl. .................................... 165/51; 123/41.49; 165/121; 165/135; 416/189
[58] Field of Search .................. 165/51, 122, 121, 135; 123/41.49; 415/172 A, DIG. 1, 219 R; 416/189

[56] References Cited
U.S. PATENT DOCUMENTS

| 176,755 | 5/1876 | Murphy | 416/189 |
|---|---|---|---|
| 2,186,837 | 1/1940 | McMahan | 123/41.49 |
| 3,433,403 | 3/1969 | Gerlitz | 415/219 R |
| 3,794,001 | 2/1974 | Birch et al. | 123/41.49 |
| 3,842,902 | 10/1974 | Poslusny | 165/51 |
| 3,937,192 | 2/1976 | Longhouse | 165/51 |

FOREIGN PATENT DOCUMENTS 113795  6/1975  German Democratic Rep. ..... 416/189

Primary Examiner—Sheldon Jay Richter
Attorney, Agent, or Firm—Charles R. White

[57] ABSTRACT

The mechanism shown and described herein is a cooling fan and associated dual shroud arrangement including (1) a rotating shroud comprised of a ring secured to the outer tips of the fan blades and a bell-mouthed inlet formed on the leading edge of the ring, and (2) a stationary shroud secured at one end or edge thereof to the radiator and terminating at the outer end thereof in an annular edge in front or upstream of the bell-mouthed inlet. A predetermined clearance is defined between the stationary shroud and the bell-mouthed inlet, effective to provide a smooth recirculating airflow around the rotating shroud and back into the main airflow stream, thereby substantially eliminating tip-vortex characteristics and resultant tip-clearance noise, and without unsteady flow interactions that cause rotational noise. In one alternate embodiment, the radiator is used in lieu of the stationary shroud for cooperation with the bell-mouthed inlet.

4 Claims, 4 Drawing Figures

FAN SHROUD ARRANGEMENT

This invention relates generally to automotive engine cooling fans and, more particularly to fans having a ring or shroud affixed to the outer tips thereof for cooperation with an adjacent fixed shroud means.

To date, due to the use of additional accessory equipment on automobiles, trucks and busses, there is an ever increasing need for higher cooling capacities, which generally tends to increase the resultant fan noise. At the same time, legislation requirements regarding noise limitations are becoming increasingly more stringent. It is necessary, therefore, to incorporate means for reducing fan noise levels to acceptable standards without suffering any loss in the cooling capabilities of the fan equipment.

It is known generally that minimal clearance between the tips of the blades of a conventional propeller-type engine cooling fan and its associated surrounding shroud serves to provide more efficient fan operation and to minimize attendant fan noise. However, because of production tolerances and fan-axis motion relative to the fixed fan shroud, moderate to large tip clearances are generally required. The tip-vortex noise resulting from airflow recirculating through the clearance and back into the mainstream is a significant fan noise factor. Therefore, there is a place for an economical and efficient fan and cooperating shroud arrangement which causes the recirculating airflow to reenter the fan in a smooth manner, i.e., without flow separation or turbulence and with minimal tip-clearance type noise.

It is known that the formation of a ring on the tips of the blades of a fan eliminates the clearance between the blades and a surrounding shroud and, hence, prevents the formation of tip-vortex or turbulence of the recirculating air, but, unless the blade ring is properly contoured, the recirculating airflow therearound will disrupt the inflow into the fan either by an unsteady interaction with the inflow or by flow separation occurring at the inlet of the rotating ring. The resultant interaction of the fan blades with such unsteady inflow will produce rotational noise.

An attempt to control the recirculating airflow via a rotating shroud coacting with a stationary shroud has been shown and described in Poslusny U.S. Pat. No. 3,842,902. However, in the latter disclosure, tests have shown that some flow unsteadiness and, hence, some rotational noise results from the positioning of the annular trailing edge of the stationary shroud downstream of the leading edge of the rotating shroud, or from flow separation when the stationary shroud straddles a non bell-mouthed rotating shroud.

Accordingly, a general object of the invention is to provide an improved fan and bell-mouthed shroud arrangement which provides for efficient fan operation with minimal resultant tip-clearance and rotational noise for either a propeller type, or mixed flow or axial-flow type fan.

Another object of the invention is to provide an improved fan and shroud arrangement including a bell-mouthed ring or shroud mounted around the tips of the fan for cooperation with the trailing portion of an adjacent stationary shroud, effective to cause recirculating airflow to reenter the mainstream in a non-turbulent manner, thereby enhancing minimal rotational noise.

A further object of the invention is to provide a fan rotatably mounted on an automotive engine adjacent a radiator and having a ring mounted around the outer tips thereof, a bell-mouthed inlet formed on the leading edge of the ring to form a rotating shroud, a stationary shroud secured to the radiator and terminating in an annular edge ahead or upstream of the rotating shroud intermediate the inner and outer diameters of the bell-mouthed extension, providing a predetermined clearance between the annular trailing edge and the inner surface of the bell-mouthed inlet of the respective rotating and stationary shrouds.

Still another object of the invention is to provide a fan having a ring with a bell-mouthed inlet mounted thereon and in such proximity with the radiator that the latter performs to some extent as the stationary shroud.

These and other objects and advantages of the invention will be apparent when reference is made to the following description and accompanying drawings, wherein.

Figure 1:
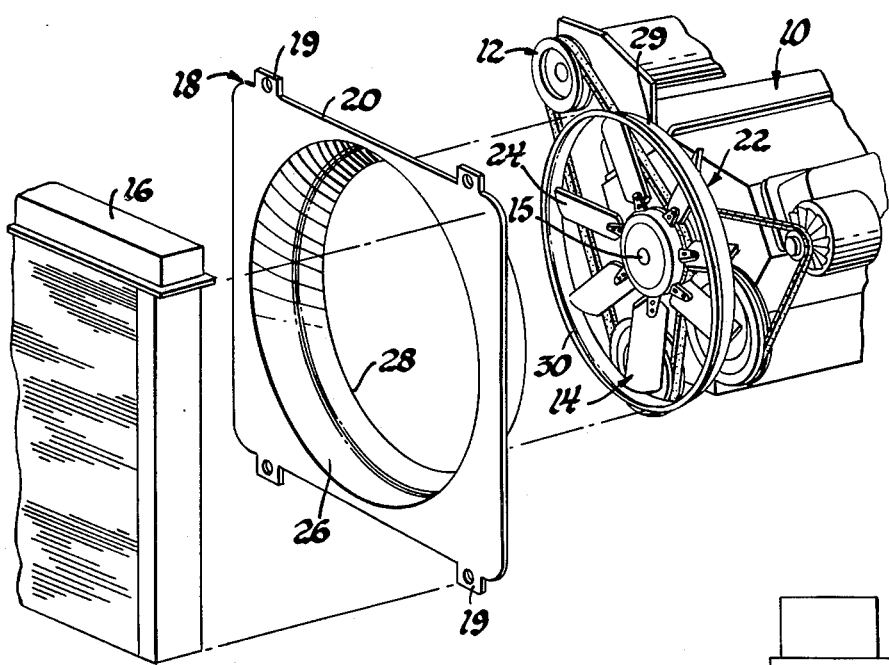
FIG. 1 is an exploded perspective view of an automotive radiator, engine and engine cooling fan and shroud arrangement embodying the invention.

Referring now to the drawings in greater detail, FIG. 1 illustrates an automotive engine 10 having the usual belt and pulley arrangement 12 associated with the forward end thereof for driving the usual accessories, including an engine cooling fan 14 mounted on a rotatable shaft 15. The fan 14 may be of the propeller or axial-flow types. A radiator 16 is located adjacent the cooling fan 14, with a stationary fan shroud 18 connected by mounting brackets 19 at a generally rectangular-shaped peripheral edge portion 20 thereof adjacent the perimeter of the radiator 16. A second fan shroud 22 is secured to the outer tips of the blades 24 of the fan 14 for rotation therewith.

Figure 2:
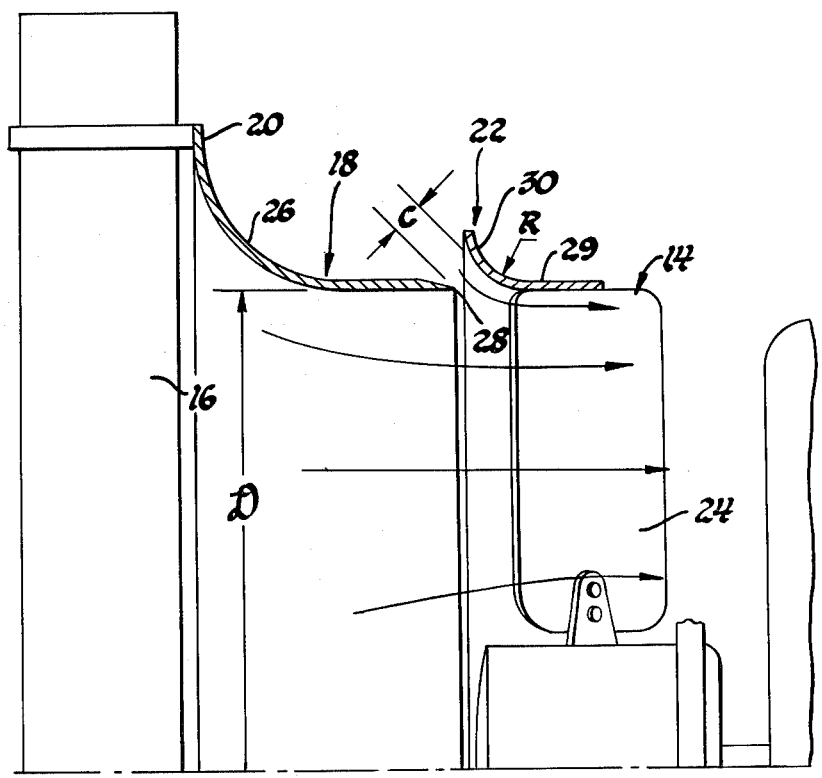
FIG. 2 is a fragmentary cross-sectional view of the fan and dual shroud portion of FIG. 1.

As may be noted by referring to FIG. 2, the stationary shroud 18 includes a bell-mouthed inlet 26, terminating in an annular trailing edge 28 in front or upstream of the fan blades 24. The second or rotatable fan shroud 22 includes a ring portion 29 and a bell-mouthed inlet 30 formed on the leading edge of the ring portion 29 having a radius R or other suitable contour and providing a predetermined minimum clearance C with the trailing edge of the stationary shroud 18, such minimum clearance being determined from an analysis of the manufacturing tolerances and the fan-axis motion relative to the stationary shroud.

The annular trailing edge 28 defines a diameter D which measures approximately the same as the inner diameter of the bell-mouthed inlet 30. While, in general, the larger the radius R, the less the rotational noise, performance requires that the size of the radius be limited. It has been determined that, for best overall performance and noise results, the radius R is preferably slightly larger than the minimum clearance C. For example, for a clearance C on the order of $\frac{1}{8}''$ on a small diameter fan for a compact automobile the preferred radius R is approximately $\frac{1}{4}''$, and for a clearance C on the order or $7/16''$ for a large truck or bus fan the suggested radius R is approximately $\frac{3}{4}''$.

Tests have shown that the stationary shroud 18 causes the recirculating airflow to remain attached to the bell-mouthed inlet 30 as it passes through the clearance C to thereby insure that the flow will reenter the fan proper in a smooth manner, substantially without creating turbulence or resulting in flow separation with respect to the main airflow stream, such smooth recirculating airflow being the key to significantly reducing rotational noise, particularly in those applications normally requiring large tip-clearance fans such as are currently used on trucks and busses in view of the relative fan-shroud movements.

Tests were run in a windtunnel using (1) a dual fan arrangement comparable to FIG. 2, with a 14 inch diameter fan, a rotating shroud having a 1 inch radius R, and a stationary shroud having a 4 inch radius, using various clearances C therebetween; and (2) a fan and single surrounding stationary shroud using various clearances S therebetween. These tests produced the following results.

| MEASURED SOUND PRESSURE LEVEL IN DECIBELS At 3600 FAN RPM | | | | | | |
|---|---|---|---|---|---|---|
| Flow Coefficient | .045" C | .220" C | .389" C | .030" S | .146" S | .324" S |
| .0625 | 91.5 | 89.5 | 88 | 90 | 89.5 | 89 |
| .075 | 88 | 86.5 | 85.5 | 91.5 | 89.5 | 89 |
| .10 | 81.5 | 84 | 86 | 89.5 | 90 | 90 |
| .125 | 79 | 82.5 | 85 | 87.5 | 90.5 | 92 |
| .15 | 79 | 82 | 85 | 85 | 92 | 93 |
| .175 | 80 | 81 | 82.5 | 80 | 91 | 91 |
| .20 | 81 | 80 | 80 | 77.5 | 89 | — |

Thus, except for the ends of the flow scale, it is apparent that the dual shroud arrangement is generally quieter than the single stationary shroud arrangement, and that the smaller the clearance for either arrangement the quieter the operation in general. It is recognized that the 0.045" and 0.030" clearances are too small to be practical in an actual vehicle application, but the test results using same substantiate the trends just described.

Figure 3:
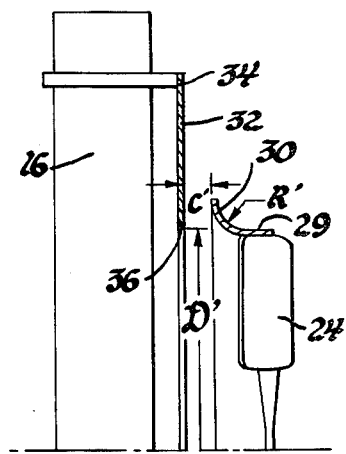
FIGS. 3 and 4 are fragmentary cross-sectional views of alternate embodiments of the invention.

Referring now to the alternate embodiment shown in FIG. 3, it may be noted that, for some vehicular applications, the stationary shroud 32 is formed so as to extend substantially radially inwardly from the peripheral edge portion 34 of the radiator 16, terminating in an annular inner opening having an edge 36 thereof in front of the bell-mouthed inlet 30. The edge 36 defines an opening having a diameter D' which measures approximately the same as the inner diameter of the adjacent bell-mouthed inlet 30, as is the case with the diameter D of FIG. 2. The radius R' and clearance C' relationship is comparable to the R-C relationship described above relative to FIG. 2. The FIG. 3 arrangement is practical for those vehicular applications wherein space between the radiator and the fan is substantially limited.

Figure 4:
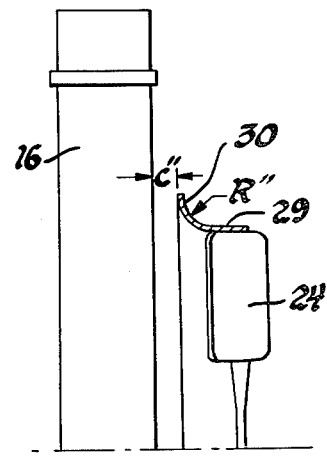

FIG. 4 is another embodiment particularly adaptable to small car applications wherein space for the fan between the radiator and the engine is limited and wherein both the fan and radiator sizes are small. In this embodiment the stationary shroud, per se, has been eliminated, and the bell-mouthed inlet 30 is located so as to define a clearance C" with the radiator 16 such the radius R" and clearance C" have the same dimensional relationship as the R'-C' relationship of FIG. 3 and the R-C relationship of FIG. 2. Thus the radiator 16 performs to some extent in the capacity of a stationary shroud without an annular inner edge.

It should be apparent that the invention provides an improved bell-mouthed shroud and fan arrangement wherein tip-clearance and rotational noises are significantly reduced without interference with fan performance and wherein the fan may be either the propeller type or axial-flow type.

While several embodiments of the invention have been shown and described, other embodiments and modifications thereof are possible.

What is claimed is:

1. In combination, an air cooled radiator, a rotatable fan spaced rearwardly of said radiator and having a plurality of radially extending circumferentially spaced fan blades for inducing a primary airflow stream through said radiator, a rotatable shroud secured to the outer tips of said fan blades including an annular section for eliminating tip vortex characteristics and resultant blade tip clearance noise, said shroud further including a bell-mouthed inlet section extending forwardly from a leading edge of said annular section, said bell-mouthed inlet section having a predetermined radius of curvature and being flared radially outwardly through an arc of at least about 90 degrees and terminating in an outwardly extending circumferential surface, stationary surface means on said radiator upstream of the fan and spaced from the circumferential surface of said bell-mouthed inlet section a distance substantially less than the radius of curvature of said bell-mouthed inlet section to define a restricted recirculating air inlet between said stationary surface means and said bell-mouthed inlet section which is effective to provide for the smooth recirculating flow of air from around the rotatable shroud into the primary airflow stream, thereby substantially eliminating unsteady flow interaction characteristics between the recirculating flow of air and blades of said rotatable fan to substantially reduce inflow noise.

2. In combination, an air cooled radiator, a rotatable fan spaced rearwardly of and closely adjacent to said radiator, and having a plurality of radially extending circumferentially spaced fan blades for inducing a primary airflow stream through said radiator, a rotatable shroud secured to the outer tips of said fan blades, including a ring section and a forwardly extending rigid bell-mouthed inlet section, said ring section being fixed to the outer tips of said blades, said bell-mouthed section flaring radially outwardly from the leading edge of the ring section through an arc of at least about 90 degrees and terminating in a radially outwardly extending circumferential surface, said ring section being adapted to eliminate the tip vortex characteristics and resultant blade tip clearance noise, and said radiator having stationary surface means upstream of the fan and spaced from the circumferential surface of said bell-mouthed inlet section a predetermined distance to define a restricted recirculating air inlet between said stationary surface means and said bell-mouthed inlet section which is effective to provide a smooth recirculating airflow stream into the said primary airflow stream thereby substantially eliminating unsteady flow interaction characteristics between the recirculation stream and blades of the rotatable fan to substantially reduce inflow noise.

3. In combination, an air cooled radiator, a rotatable fan spaced rearwardly of said radiator and having a plurality of radially extending and circumferentially spaced fan blades for inducing a primary airflow stream through said radiator, a rotatable thin-walled shroud, said shroud including a cylindrical section surrounding and secured to the outer tips of said fan blades and including a bell-mouthed inlet section extending forwardly from said cylindrical section, said bell-mouthed section flaring radially outwardly from said cylindrical section and having a radially outwardly extending cross section, said cross section having a center external of said shroud, said bell-mouthed section having a predetermined radius of curvature and terminating in an outwardly directed forward annular edge, said annular edge of said bell-mouthed inlet section being spaced from the adjacent face of the radiator a distance less than the radius of said bell-mouthed inlet section to define a restricted air flow inlet for recirculated air discharge by said fan, said bell-mouthed inlet section providing for the smooth recirculation of airflow around the rotatable shroud and back into said primary airflow stream with minimized flow separation from the walls of said bell-mouthed section to thereby substantially eliminate unsteady flow interaction between recirculating air and said blades of said rotatable fan and recirculating air to reduce inflow noise.

4. In combination, an air cooled radiator, a rotatable fan spaced rearwardly of and adjacent to said radiator, and having a plurality of radially extending circumferentially spaced fan blades for inducing a primary airflow stream through said radiator, a rotatable shroud secured to the outer tips of said fan blades, including a ring section and a forwardly extending rigid bell-mouthed inlet section, said ring section being fixed to the outer tips of said blades, said bell-mouthed section flaring radially outwardly from the leading edge of the ring section through an arc of at least about 90 degrees and terminating in a radially outwardly extending circumferential surface, said ring section being adapted to eliminate the tip vortex characteristics and resultant blade tip clearance noise, and said radiator having stationary surface means upstream of the fan and spaced from the circumferential surface of said bell-mouthed inlet section a predetermined distance to define a restricted recirculating air inlet between said stationary surface means and said bell-mouthed inlet section which is effective to provide a smooth recirculating airflow stream into the said primary airflow stream thereby substantially eliminating unsteady flow interaction characteristics between the recirculation airflow stream and blades of the rotatable fan to substantially reduce inflow noise, said stationary surface means on said radiator being an annular shroud fixed to said radiator and extending therefrom toward said rotatable shroud, said fixed shroud terminating in an annular edge forming the extremity of said stationary surface means adjacent to said circumferential surface of said ring section.

* * * * *